US011398625B2

(12) United States Patent
Chavillon et al.

(10) Patent No.: US 11,398,625 B2
(45) Date of Patent: Jul. 26, 2022

(54) SPECIFIC NEGATIVE ELECTRODE BASED ON LITHIUM AND LITHIUM ELECTROCHEMICAL GENERATOR COMPRISING SUCH A NEGATIVE ELECTRODE

(71) Applicant: COMMISSARIAT À L'ÉNERGIE ATOMIQUE ET AUX ÉNERGIES ALTERNATIVES, Paris (FR)

(72) Inventors: Benoît Chavillon, Grenoble (FR); Philippe Azais, Grenoble (FR); Eric Mayousse, Grenoble (FR)

(73) Assignee: COMMISSARIAT Á L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 211 days.

(21) Appl. No.: 16/663,556

(22) Filed: Oct. 25, 2019

(65) Prior Publication Data

US 2020/0136134 A1 Apr. 30, 2020

(30) Foreign Application Priority Data

Oct. 29, 2018 (FR) ...................................... 1860010

(51) Int. Cl.
*H01M 4/40* (2006.01)
*H01M 4/06* (2006.01)
*H01M 4/38* (2006.01)
*H01M 4/505* (2010.01)
*H01M 4/525* (2010.01)
*H01M 4/62* (2006.01)
*H01M 6/36* (2006.01)
*H01M 4/02* (2006.01)

(52) U.S. Cl.
CPC .............. *H01M 4/405* (2013.01); *H01M 4/06* (2013.01); *H01M 4/382* (2013.01); *H01M 4/505* (2013.01); *H01M 4/525* (2013.01); *H01M 4/622* (2013.01); *H01M 6/36* (2013.01); *H01M 2004/027* (2013.01); *H01M 2004/028* (2013.01); *H01M 2300/0037* (2013.01)

(58) Field of Classification Search
None
See application file for complete search history.

(56) References Cited

U.S. PATENT DOCUMENTS 3,930,888 A 1/1976 Bowser et al.
5,415,954 A 5/1995 Gauthier et al.

FOREIGN PATENT DOCUMENTS

EP 0105799 A1 4/1984
JP 2012-142101 * 7/2012

OTHER PUBLICATIONS

The abstract of Jarabek et al. "Discharge characteristics of lithium alloy anodes in lithium/iodine cells", Journel of Geophysical Research, vol. 79-2, 1979, pp. 17-19.*
Search Report for French Application No. 1860010 dated Jun. 24, 2019.

* cited by examiner

*Primary Examiner* — Laura Weiner
(74) *Attorney, Agent, or Firm* — Pearne & Gordon LLP

(57) ABSTRACT

A negative electrode for a lithium electrochemical generator, wherein it comprises, as active material, a lithium and calcium alloy, wherein the calcium is present in the alloy to the extent of 2% to 34% of atomic.

16 Claims, 3 Drawing Sheets

SPECIFIC NEGATIVE ELECTRODE BASED ON LITHIUM AND LITHIUM ELECTROCHEMICAL GENERATOR COMPRISING SUCH A NEGATIVE ELECTRODE

CROSS-REFERENCE TO RELATED APPLICATIONS

This application claims priority from French Patent Application No. 18 60010 filed on Oct. 29, 2018. The content of this application is incorporated herein by reference in its entirety.

TECHNICAL FIELD

The present invention relates to a specific negative electrode that can be used in an energy storage device and, more specifically, a lithium electrochemical generator, this generator being able to be a primary electrochemical generator (or battery) when it is not rechargeable, or a secondary electrochemical generator (or accumulator) when it is rechargeable.

The present invention also relates to an electrochemical generator comprising such a negative electrode, this electrochemical generator having effective electrochemical properties while being able to have a thinner negative-electrode thickness more easily than for an electrode comprising solely metallic lithium, thus conferring a special advantage for power applications.

The field of the invention can be defined as that of energy storage devices, in particular that of lithium electrochemical generators.

PRIOR ART

Energy storage devices are conventionally electrochemical generators functioning on the principle of electrochemical cells able to deliver an electric current by means of the presence in each of them of a pair of electrodes (respectively a positive electrode and a negative electrode) separated by an electrolyte, the electrodes comprising specific materials able to react in accordance with an oxidation-reduction reaction, by means of which there is a production of electrons giving rise to the electric current and production of ions that will circulate from one electrode to the other by means of an electrolyte.

Electrochemical generators of this type that are most used at the present time are as follows:
- Ni-MH electrochemical generators using metallic hydride and nickel oxyhydroxide as electrode materials;
- Ni—Cd electrochemical generators using cadmium and nickel oxyhydroxide as electrode materials;
- lead-acid electrochemical generators using lead and lead oxide $PbO_2$ as electrode materials; and
- lithium electrochemical generators, such as those using metallic lithium as the active material of the negative electrode.

Because metallic lithium is a particularly lightweight solid element and has the lowest electrochemical potential, thus affording access to an advantageous energy density per unit mass, lithium electrochemical generators are candidates that are particularly favourable for supplanting the other types of accumulator mentioned above.

More specifically, metallic lithium, which can constitute the active material of the negative electrode, is a material that can be used in the majority of systems since its energy per unit mass and volume is high. This is because lithium has a density of $0.534$ g/$cm^3$ and an energy per unit mass of 3861 mAh/g as well as an energy density per unit volume of 2061 mAh/$cm^3$. These values remain very high compared with those obtained with other negative-electrode materials, in particular through the reaction $Li \rightarrow Li^+ + e^-$, this reaction involving the exchange of a single electron per lithium atom, which is very light, thus generating a large quantity of energy for a low volume/mass ratio.

One of the drawbacks relating to the use of lithium is due firstly to the possible formation of lithium peroxide during the discharge processes, and secondly to the possible formation of lithium dendrites during repeated charging processes, which may short-circuit the accumulator and damage it.

Moreover, lithium may pose safety problems, because of its melting point of 180° C., and may present difficulties in handling for manufacturing negative electrodes.

This is because lithium is a highly reactive metal, in particular when it is subjected to an environment comprising water, nitrogen and/or oxygen, and has an ability to adhere to all types of metals or alloys, such as stainless steel, steel or even certain fluorinated polymers. Thus it may prove difficult to handle and shape, for example by rolling or extrusion, unless special precautions are taken, in particular by working in a neutral atmosphere devoid of moisture and/or working with tools coated with a layer of non-reactive polymer, such as low-density polyethylene.

Finally, for use in electrochemical generators, such as batteries or accumulators, it may be advantageous to use, in order to form the negative electrode, very thin strips of lithium, for example with a thickness ranging from 10 to 50 μm, in view in particular of increasing the power density. However, such a thickness is impossible to achieve with standard rolling mills and, when such strips are available commercially, they are very expensive, even when they are already prelaminated on current collectors (for example a copper strip).

Thus, in the light of the drawbacks mentioned above and in particular those relating to the difficulty of handling lithium in order to produce thin negative electrodes, the authors of the present invention have set themselves the objective of proposing a novel type of negative electrode based on lithium that can be used in lithium electrochemical generators as well as a novel type of lithium electrochemical generator comprising this type of negative electrode.

DISCLOSURE OF THE INVENTION

Thus the invention relates to a negative electrode for a lithium electrochemical generator, characterised in that it comprises, as active material, a lithium and calcium alloy, wherein the calcium is present in the alloy to the extent of 2% to 34% atomic and which advantageously is in the form of a sheet or plate having a thickness ranging from 5 to 200 μm.

Before going into more detail in the disclosure of this invention, the following definitions are given.

% atomic means, conventionally, above and hereinafter, the ratio corresponding to the ratio of the (total number of calcium atoms/total number of atoms of the alloy)*100.

Negative electrode means, conventionally, above and hereinafter, the electrode that serves as an anode when the electrochemical generator supplies current (that is to say when it is in the process of discharging) and which serves as a cathode when the electrochemical generator is in the process of charging (in the latter case, the electrochemical generator can be termed an accumulator, because it can be subjected to a charging and discharging process).

Active material of the negative electrode means, conventionally, above and hereinafter, the material that is directly involved in the oxidation reaction taking place at the negative electrode, this active material being, in the context of this invention, a lithium and calcium alloy.

The negative electrode comprising such an active material can easily be prepared by rolling and have small thicknesses compatible for obtaining an improvement in the power density.

More specifically, the negative electrode may consist solely of the active material, which is the lithium and calcium alloy as mentioned above.

From a structural point of view, the negative electrode is advantageously in the form of a sheet or plate having a thickness ranging from 5 to 200 µm, more specifically from 20 to 100 µm.

Advantageously, the lithium and calcium alloy forming the active material of the negative electrode is an alloy comprising solely lithium and calcium, which means that the alloy comprises calcium to the extent of 2% to 34% atomic and lithium to the extent of 66% to 98% atomic.

More specifically, it may be a lithium alloy comprising calcium to the extent of 2% to 15% atomic (which means, in other words, that, when the lithium and calcium alloy comprises solely lithium and calcium, the lithium is present in the alloy to the extent of 85% to 98% atomic).

The calcium in the lithium and calcium alloy may, wholly or partly, be in the form of $CaLi_2$. In the latter case, the lithium and calcium alloy can be considered to be a material comprising a lithium matrix wherein all or part of the calcium is in the form of $CaLi_2$ inclusions in the lithium matrix.

The authors of the present invention have been able to show that such an alloy is easily rolled and has good mechanical properties, in particular in terms of tensile strength, in particular for thicknesses as defined above. What is more, an electrode comprising such an alloy can be produced at lower manufacturing costs compared with an electrode having the same thickness of electrode made from metallic lithium.

Advantageously, the negative electrode can be self-supporting, that is to say it does not require to be placed on a support and, more specifically, does not require to be placed on a current collector. In a variant, it can be associated with a support, for example of the current collector type, which may be a strip or grille made of at least from an electrically conductive metallic element, such as copper, nickel, tantalum, titanium or tungsten, said strip or grille being able to have a thickness ranging up to 500 µm.

The negative electrodes are particularly suited for forming part of lithium electrochemical generators (whether they be batteries or accumulators).

Thus the invention relates also to an electrochemical generator comprising at least one electrochemical cell comprising a positive electrode comprising, as active material, a lithium-insertion material, a negative electrode and an electrolyte conducting lithium ions disposed between said negative electrode and said positive electrode, characterised in that the negative electrode is as defined above.

Positive electrode means, conventionally, above and hereinafter, the electrode that serves as a cathode when the electrochemical generator is supplying current (that is to say when it is in the process of discharging) and which serves as an anode when the electrochemical generator is in the process of charging (in the latter case, the electrochemical generator can be termed an accumulator because it can be subjected to a charging and discharging process).

The positive electrode of the electrochemical generator of the invention comprises, as active material, a lithium-insertion material and, more specifically, a material chosen from lithiated oxides comprising at least one transition metal element, lithiated phosphates comprising at least one transition metal element or manganese dioxide.

As lithiated oxide comprising at least one transition metal element, mention can be made of an oxide of the following formula:

$$LiMO_2$$

in which M is an element chosen from Ni, Co, Mn, Al, Mg and the mixtures thereof, and preferably again with M being an element chosen from Ni, Co, Mn, Al and the mixtures thereof.

From a structural point of view, the oxide of the above formula has a lamellar structure.

By way of examples of such oxides, mention can be made of the lithiated oxides $LiCoO_2$, $LiNiO_2$ and the mixed oxides $Li(Ni,Co,Mn)O_2$ (and more specifically $LiNi_xMn_yCo_zO_2$, in which x+y+z=1, such as $Li(Ni_{1/3}Mn_{1/3}Co_{1/3})O_2$ also known by the name NMC), $Li(Ni,Co,Al)O_2$ (and more specifically $LiNi_xCo_yAl_zO_2$, in which x+y+z=1, such as $Li(Ni_{0.8}Co_{0.15}Al_{0.05})O_2$ also known by the name NCA) or $Li(Ni,Co,Mn,Al)O_2$.

As lithiated oxide comprising at least one transition metal element, mention can also be made of the lithiated oxides with a spinel structure, such as $LiMn_2O_4$.

As examples of lithiated phosphate compounds comprising at least one transition metal element, mention can be made of the compounds of formula $LiM^1PO_4$, where $M^1$ is chosen from Fe, Mn, Co and the mixtures thereof, such as $LiFePO_4$.

When the active material of the positive electrode is manganese dioxide $MnO_2$, this may be of natural or synthetic origin (for example obtained by chemical or electrolytic method).

Moreover, electrolytic generators based on $MnO_2$ as the positive-electrode active material have the following advantages:

an operating voltage almost twice as high as alkaline batteries and a stable discharge voltage;
energy densities per unit mass that may range from 280 to 360 Wh/kg (in particular for batteries having a cylindrical format);
low self-discharge (a few percentages per year);
application in numerous civil fields (such as multimedia, toys).

The active material of the positive electrode may be present to the extent of 80% to 95% by mass of the total mass of the positive electrode.

Furthermore, the positive electrode may comprise at least one electron-conducting additive and/or at least one binder, which can make it possible to ensure cohesion of the positive electrode.

The electron-conducting additive may be chosen from carbon blacks, acetylene blacks, graphite (in particular graphite powder), carbon fibres (in particular carbon fibres obtained in vapour phase known by the abbreviation VGCF), nanotubes of carbon, titanium (in particular in powder form), nickel (in particular in powder and foam form), aluminium (in particular in powder form), stainless steel (in particular in powder form) and mixtures thereof.

The binder or binders may in particular be chosen from polymeric binders, such as:

fluorinated (co)polymers, optionally proton conducting, such as:

fluorinated polymers, such as a polytetrafluoroethylene (known by the abbreviation PTFE), a polyvinylidene fluoride (known by the abbreviation PVDF);

fluorinated copolymers, such as a poly(vinylidene fluoride-co-hexafluoropropene) (known by the abbreviation PVDF-HFP);

proton-conducting fluorinated polymers, such as Nafion®;

elastomer polymers, such as a styrene-butadiene copolymer (known by the abbreviation SBR), an ethylene propylene diene monomer copolymer (known by the abbreviation EPDM);

polymers of the polyvinyl alcohol family;

cellulosic polymers, such as a sodium carboxymethyl cellulose; and mixtures thereof.

Preferably the binder used is a binder based on a fluorinated polymer, such as a polytetrafluoroethylene, a polyvinylidene fluoride and mixtures thereof, this type of binder making it possible to obtain a good percolating lattice.

Furthermore, the positive electrode may also be associated with a support intended, as its name indicates, to support the aforementioned ingredients, this support furthermore being able to help to ensure good mechanical strength of the electrode and good electron conduction (in which case it may be termed a current-collector support).

This type of electrode may also be referred to as supported.

This support may be in the form of a foam, a grille or a plate or be made from a material comprising a metal or a metal alloy or a carbon material.

It may be a case, particularly, of a titanium support, an aluminium support, a nickel support, a tantalum support or a stainless-steel support, these supports being able to be in the form of sheets or grilles.

The electrolyte intended to form part of the electrochemical generators of the invention may be a liquid electrolyte comprising at least one organic solvent and at least one lithium salt.

It may comprise:

as solvent(s), one or more organic solvents chosen from carbonate solvents, ether solvents, amide solvents, sulfoxide solvents, lactone solvents, lactam solvents, nitrile solvents, ester solvents, sulfite solvents and mixtures thereof;

at least one lithium salt;

optionally an additive other than a lithium salt.

By way of examples, the lithium salt may be chosen from the group consisting of $LiPF_6$, $LiClO_4$, $LiBF_4$, $LiAsF_6$, $LiSbF_6$, $LiAlCl_4$, $LiGaCl_4$, $LiCF_3SO_3$, $LiC(SO_2CF_3)_3$, lithium bis(trifluoromethylsulfonyl)imide (known by the abbreviation LiTFSI), $LiN[SO_2CF_3]_2$, LiSCN, lithium nitrate $LiNO_3$, lithium bis(oxalato)borate (known by the abbreviation LIBOB), lithium bis(fluorosulfonyl)imide (known by the abbreviation LiFSI), $LiPF_3(CF_2CF_3)_3$ (known by the abbreviation LiFAP), lithium trifluoromethanesulfonate $LiCF_3SO_3$ (known by the abbreviation LiTf), lithium fluorosulfonate $LiSO_3F$, $LiC_6F_5SO_3$, $LiO_3SCF_2CF_3$, $LiO_2CCF_3$, $LiB(C_6H_5)_4$ and the mixtures thereof.

The lithium salt may be included, in the electrolyte, to the extent of 0.1 M to 2 M, preferably 0.5 to 1.5 M.

As an organic solvent belonging to the family of carbonate solvents, mention can be made of ethylene carbonate (known by the abbreviation EC), propylene carbonate (known by the abbreviation PC), dimethyl carbonate (known by the abbreviation DMC), diethyl carbonate (known by the abbreviation DEC) and the mixtures thereof.

As an organic solvent belonging to the family of ether solvents, mention can be made of tetrahydrofuran (known by the abbreviation THF), 1, 2-dimethoxyethane (known by the abbreviation DME), diglyme, triglyme, tetraglyme or tetraethylene glycol dimethyl ether (known by the abbreviation TEGDME) and methoxybenzene.

As an organic solvent belonging to the family of amide solvents, mention can be made of dimethylformamide and dimethylacetamide.

As an organic solvent belonging to the family of sulfoxide solvents, mention can be made of dimethylsulfoxide (known by the abbreviation DMSO).

As an organic solvent belonging to the family of lactone solvents, mention can be made of γ-butyrolactone, γ-valerolactone, δ-valerolactone, ε-caprolactone and γ-caprolactone.

As an organic solvent belonging to the family of lactam solvents, mention can be made of N-methyl-2-pyrrolidone (known by the abbreviation NMP).

As an organic solvent belonging to the family of nitrile solvents, mention can be made of acetonitrile.

As an organic solvent belonging to the family of ester solvents, mention can be made of methyl acetate.

As an organic solvent belonging to the family of sulfite solvents, mention can be made of dimethylsulfite.

The solvent may be used in the form of a single solvent or a mixture of separate solvents (able thus to form a binary solvent or a ternary solvent).

For example, the solvent may consist of a mixture of a plurality of carbonate solvents, and more specifically a mixture of three carbonate solvents, a mixture meeting this specificity being the ethylene carbonate/propylene carbonate/dimethyl carbonate mixture.

As an additive other than a lithium salt, an additive for improving certain properties may be added, for example for controlling passivation, reducing autodischarge or improving a precise functioning condition (for example at a given temperature or at a given rating), one example of an additive being fluoroethylene carbonate (known by the abbreviation FEC).

The aforementioned liquid electrolyte may be caused, in the electrochemical cell or cells of the electrochemical generators of the invention, to impregnate a separator, which is disposed between the positive electrode and the negative electrode of the electrochemical cell.

This separator may be made from a porous material able to accept the liquid electrolyte in its porosity.

This separator may consist of a membrane made from a material chosen from glass fibres (and more specifically a non-woven fabric of glass fibres), a polymeric material such as a polyterephthalate (such as an ethylene polyterephthalate, known by the abbreviation PET), a polyolefin (for example a polyethylene or a polypropylene), a polyvinyl alcohol, a polyamide, a polytetrafluoroethylene (known by the abbreviation PTFE), a polyvinyl chloride (known by the abbreviation PVC) or a polyvinylidene fluoride (known by the abbreviation PVDF). The separator may have a thickness ranging from 5 to 300 μm.

The electrolyte may also be an ionic liquid, for example 1-methyl-1-propylpiperidinium bis(trifluoromethylsulfonyl)imidide, 1-n-butyl-1-methylpyrrolidinium bis(trifluoromethylsulfonyl)imidide and mixtures thereof.

The electrolyte may also consist of a solid electrolyte, for example, a solid membrane conducting lithium ions, conventionally referred to as LISICON (corresponding to the English terminology Lithium Super Ionic Conductor), this ceramic membrane being able to be of the perovskite type, such as (La,Li)TiO$_3$ (known by the abbreviation LLTO), of the garnet type, such as Li$_5$La$_3$Ta$_2$O$_{12}$ or Li$_6$La$_3$Zr$_2$O$_{11.5}$, of the phosphate type, such as Li$_{1+x}$Al$_x$Ge$_{2-x}$(PO$_4$)$_3$ with 0<x<0.8 (known by the abbreviation LAGP), Li$_{1+x}$Ti$_{2-x}$Al$_x$(PO$_4$)$_3$ with 0.25<x<0.3 and Li$_{1+x+y}$Ti$_{2-x}$Al$_x$Si$_y$(PO$_4$)$_{3-y}$ with 0.2<x<0.25 and 0<y<0.05 (known by the abbreviation LTAP).

The electrolyte may also be a polymer electrolyte comprising at least one polymer resulting from the polymerisation of one or more monomers, such as vinylidene fluoride or hexafluoropropylene, and comprising at least one lithium salt, such as at least one of those mentioned above with regard to the aforementioned liquid electrolytes.

The electrochemical generators of the invention may be included in a rigid enclosure, for example made from stainless steel, nickel steel, aluminium or titanium or in a flexible enclosure.

The electrochemical generators of the invention may be adapted to various types of format, such as the format of the button battery type, cylindrical formats, in particular the AAA, AA, C, D and DD formats; wound or spiral formats; the prismatic format.

An electrochemical generator specific to the invention is an electrochemical generator comprising at least one electrochemical cell comprising:
- a negative electrode consisting of a sheet of lithium and calcium alloy comprising a calcium content of 2% atomic or 15% atomic;
- a positive electrode comprising a mixture comprising LiFePO$_4$ (for example to the extent of 90.5% by mass), carbon black (for example to the extent of 4.5% by mass) and a polymeric binder, for example polyvinylidene fluoride (for example to the extent of 4.5% by mass), this mixture being deposited on a current-collecting substrate, for example, an aluminium strip;
- a porous separator disposed between said negative electrode and said positive electrode, said separator being impregnated with an electrolyte comprising a lithium salt LiPF$_6$ in a mixture of carbonate solvents (for example, a ternary mixture of ethylene carbonate/propylene carbonate/dimethyl carbonate).

This electrochemical generator is a secondary electrochemical generator and may therefore be termed an accumulator.

Another electrochemical generator according to the invention is an electrochemical generator comprising at least one electrochemical cell comprising:
- a negative electrode consisting of a sheet of lithium and calcium alloy comprising a calcium content of 2% atomic or 15% atomic;
- a positive electrode comprising a mixture comprising MnO$_2$ (for example to the extent of 80% by mass), acetylene black (for example to the extent of 10% by mass) and a polymeric binder, for example, polyvinylidene fluoride (for example to the extent of 10% by mass), this mixture being deposited on a current-collecting substrate, for example an aluminium strip;
- a porous separator disposed between said negative electrode and said positive electrode, said separator being impregnated with an electrolyte comprising a lithium salt LiPF$_6$ in a mixture of carbonate solvents (for example a ternary mixture of ethylene carbonate/propylene carbonate/dimethyl carbonate).

The electrochemical generators of the invention may be produced by conventional techniques within the capability of a person skilled in the art, for example by stacking various elements constituting the electrochemical generator (namely a negative electrode, positive electrode and separator), this stack being able to be held in a casing. The alloy constituting the negative electrode may be produced by fusion of lithium and calcium, for example on a heated plate, at a temperature that may range from 140° to 500° C., in a neutral atmosphere (for example an argon atmosphere), followed, after mixing, by quenching of the molten mixture in order to rapidly form the alloy. The alloy thus obtained may be shaped into a plate or sheet by rolling with a view to forming part of the negative electrode.

The invention will now be described with reference to the following example given by way of indication and non-limitatively.

DETAILED DISCLOSURE OF PARTICULAR EMBODIMENTS

Example 1

The following example illustrates the synthesis of several materials consisting of a lithium and calcium alloy and the determination of the mechanical properties thereof.

More precisely, a lithium and calcium alloy is prepared comprising calcium at 2% atomic, a lithium and calcium alloy comprising calcium at 4% atomic, a lithium and calcium alloy comprising calcium at 8% atomic and a lithium and calcium alloy comprising calcium at 14.76% atomic.

To do this, metallic lithium and metallic calcium are melted on a heated plate in an argon atmosphere in the required proportions, and, after mixing, quenching of the molten medium obtained is carried out in order to rapidly form a solid material.

The solid materials obtained are analysed by X-ray diffraction, the resulting diagrams illustrating for each of the materials the presence of metallic lithium and the presence of calcium in the form of $CaLi_2$.

The various solid materials were also able to be rolled in the form of sheets at thicknesses ranging from 20 to 30 µm, such thicknesses not being achievable as easily with solid materials based on metallic lithium alone since they become sticky and easily tear at thicknesses below 100 µm.

Tensile tests at 1 mm/minute were also carried out with test pieces 100 µm thick obtained with the material comprising calcium at 2% atomic and the material comprising calcium at 4% atomic and with, as a reference, a material consisting solely of metallic lithium.

Figure 1:
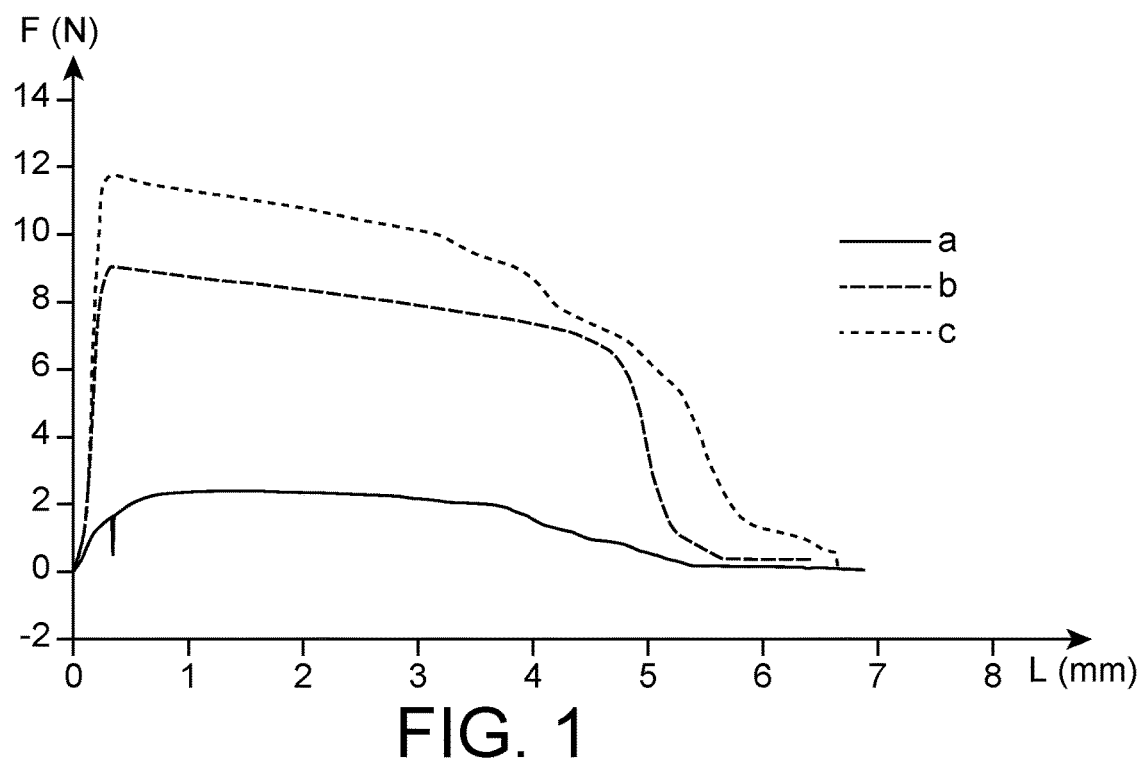
FIG. 1 is a graph illustrating the change in the tensile force F (in N) as a function of the elongation L (in mm) for materials illustrated in example 1 below, curve a) relating to that obtained with the material consisting solely of metallic lithium, curve b) relating to that obtained with the material comprising calcium at 2% atomic and curve c) relating to that obtained with the material comprising calcium at 4% atomic.

The results are set out in FIG. 1 illustrating the change in the tensile force F (in N) as a function of the elongation L (in mm), curve a) relating to that obtained with the material consisting solely of metallic lithium, curve b) relating to that obtained with the material comprising calcium at 2% atomic and curve c) relating to that obtained with material comprising calcium at 4% atomic.

It is clear that a start of rupture occurs as soon as a force of 2 N is applied for the material consisting solely of metallic lithium while a force of 9 N is necessary for the material comprising calcium at 2% atomic and a force of 12 N for the material comprising 4% atomic in order to obtain this same start of rupture. Thus these results demonstrate that calcium confers a beneficial effect on the mechanical properties for the material when it is included and are consistent with what is observed with the rolling tests.

The functioning of the material comprising calcium at 2% atomic and calcium at 8% atomic, as a negative electrode, was also tested in an electrochemical generator system where it faces a metallic lithium electrode.

The two materials comprise the same quantity of lithium and have respectively a thickness of 100 µm for the material comprising calcium at 2% atomic and a thickness of 160 µm for the material comprising calcium at 8% atomic.

Figure 2:
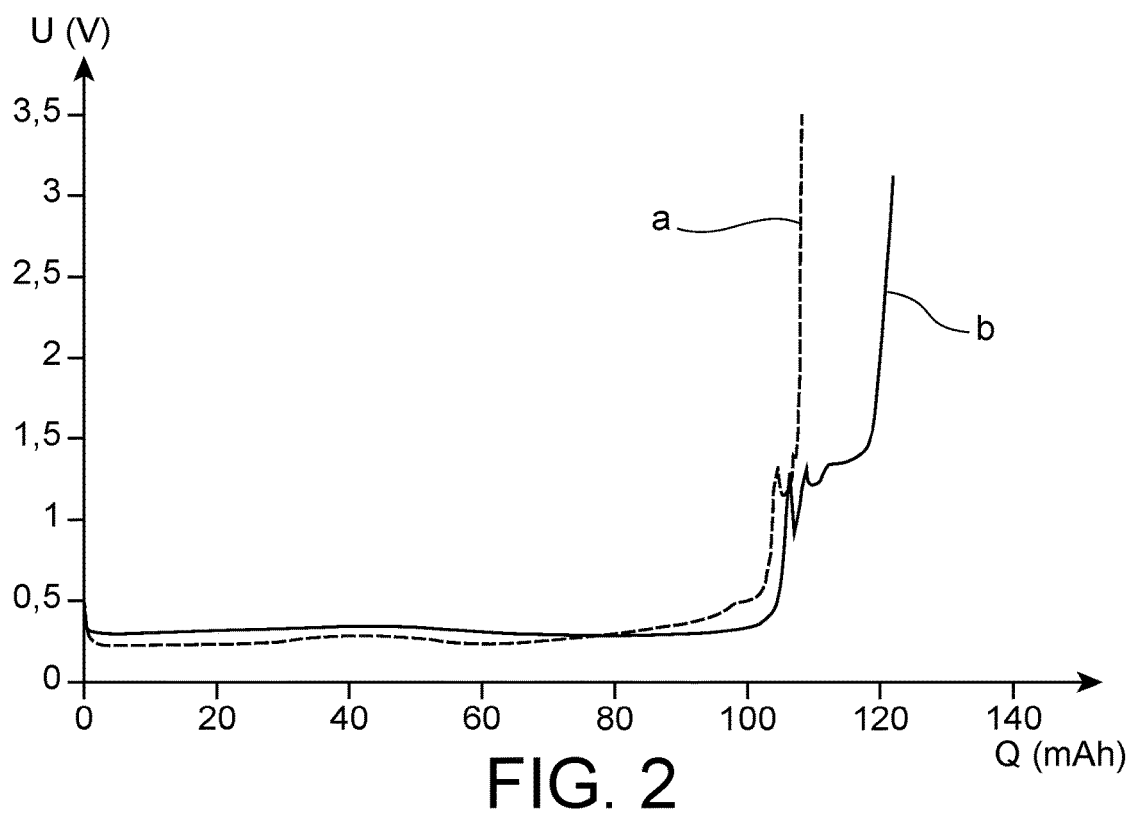
FIG. 2 is a graph illustrating the change in the voltage U (in V) as a function of the charge Q (in mAh) with curve a) for the electrochemical generator comprising the material comprising calcium at 2% atomic and curve b) for the electrochemical generator comprising the material comprising calcium at 8% atomic of example 1 below.

The resulting electrochemical generators are subjected to tests, at 20° C., intended to show the change in the voltage U (in V) as a function of the charge Q (in mAh), the results being set out in FIG. 2 with curve a) for the electrochemical generator comprising the material comprising calcium at 2% atomic and curve b) for the electrochemical generator comprising the material comprising calcium at 8% atomic.

It is clear from these curves that each of these materials is completely discharged on the lithium anode.

Figure 3:
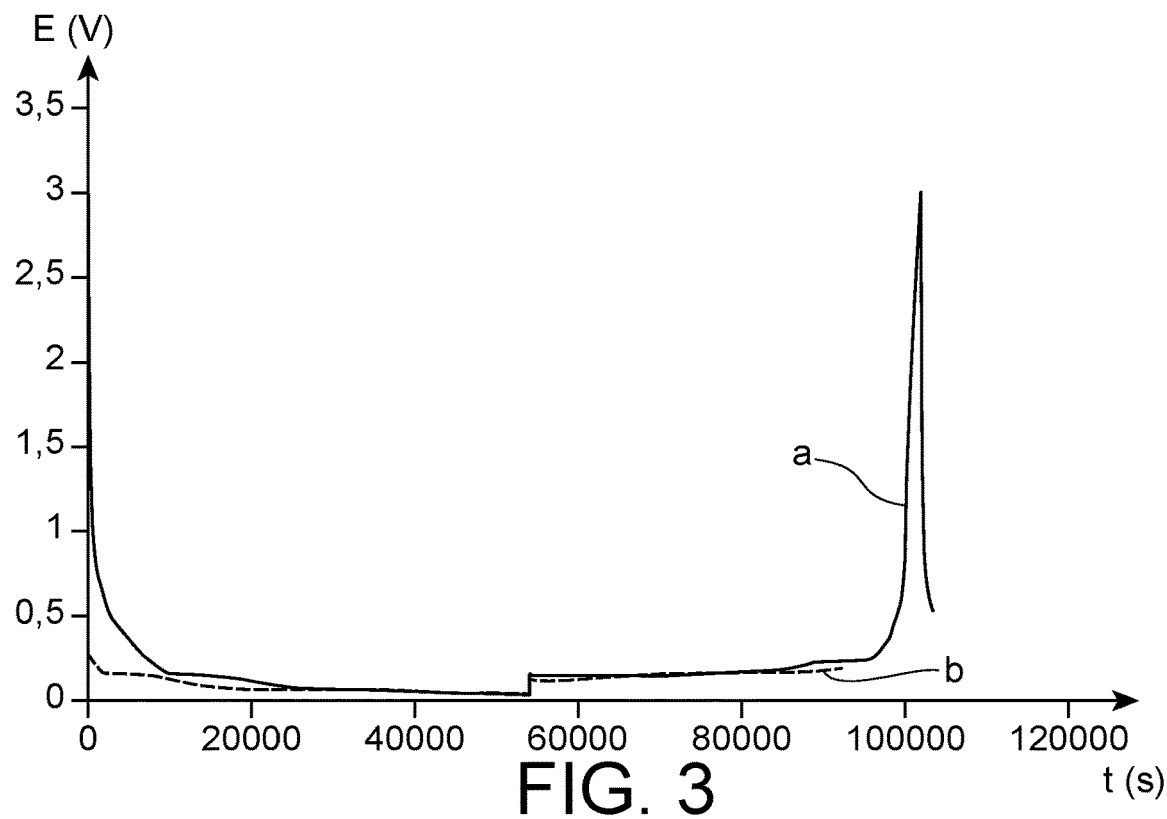
FIG. 3 is a graph illustrating the change in the potential E (in V) as a function of the test time t (in s) with curve a) for the electrochemical generator comprising the material comprising calcium at 8% atomic and curve b) for the electrochemical generator comprising the material comprising solely metallic lithium of example 1 below.

To finish, the material comprising 8% calcium was tested in an electrochemical generator facing graphite and cycling it at 200 µA for 3 mAh in comparison with an electrochemical generator comprising solely metallic lithium facing graphite, the curves being set out in FIG. 3 illustrating the change in the potential E (in V) as a function of the test time t (in s) (curve a) for the electrochemical generator comprising the material comprising calcium at 8% atomic and curve b) for the electrochemical generator comprising the material comprising solely metallic lithium).

It is clear from these curves that the lithium and calcium alloy can be used in an electrochemical generator at a reversible active material.

Example 2

The following example illustrates a first electrochemical generator according to the invention in the form of a button battery comprising:

a negative electrode consisting of a 14 mm diameter disc and composed of a lithium and calcium alloy to the extent of calcium at 2% atomic, said electrode having a thickness of 100 µm and a surface area of 1.54 $cm^2$;

a positive electrode consisting of a 16 mm diameter disc, said electrode being composed of a layer comprising $LiFePO_4$ (90.5% by mass), polyvinylidene fluoride (5% by mass) and Super P® carbon black (4.5% by mass), this layer being deposited on an aluminium strip having a thickness of 20 µm and the $LiFePO_4$ grammage being approximately 30 mg/$cm^2$, that is to say a battery capacity of approximately 4.5 mAh/$cm^2$;

between the negative electrode and the positive electrode, a Celgard 2400° separator in the form of a disc with a diameter of 16 mm and a surface area of 2 $cm^2$, said separator being impregnated with an electrolyte consisting of a mixture of carbonate solvents EC:PC:DMC in respective proportions by mass of 1/1/3 and a lithium salt 1 M $LiPF_6$.

Another electrochemical generator according to the invention (referred to as the second electrochemical generator) was produced, this electrochemical generator meeting the same specificities as those illustrated above, except that the alloy of the negative electrode comprises 15% by mass calcium.

As a comparison, another electrochemical generator not in accordance with the invention (referred to as the third electrochemical generator) was produced in this example, this electrochemical generator meeting the same specificities as those of the electrochemical generators in accordance with the invention except that the negative electrode is made from pure lithium.

Figure 4:
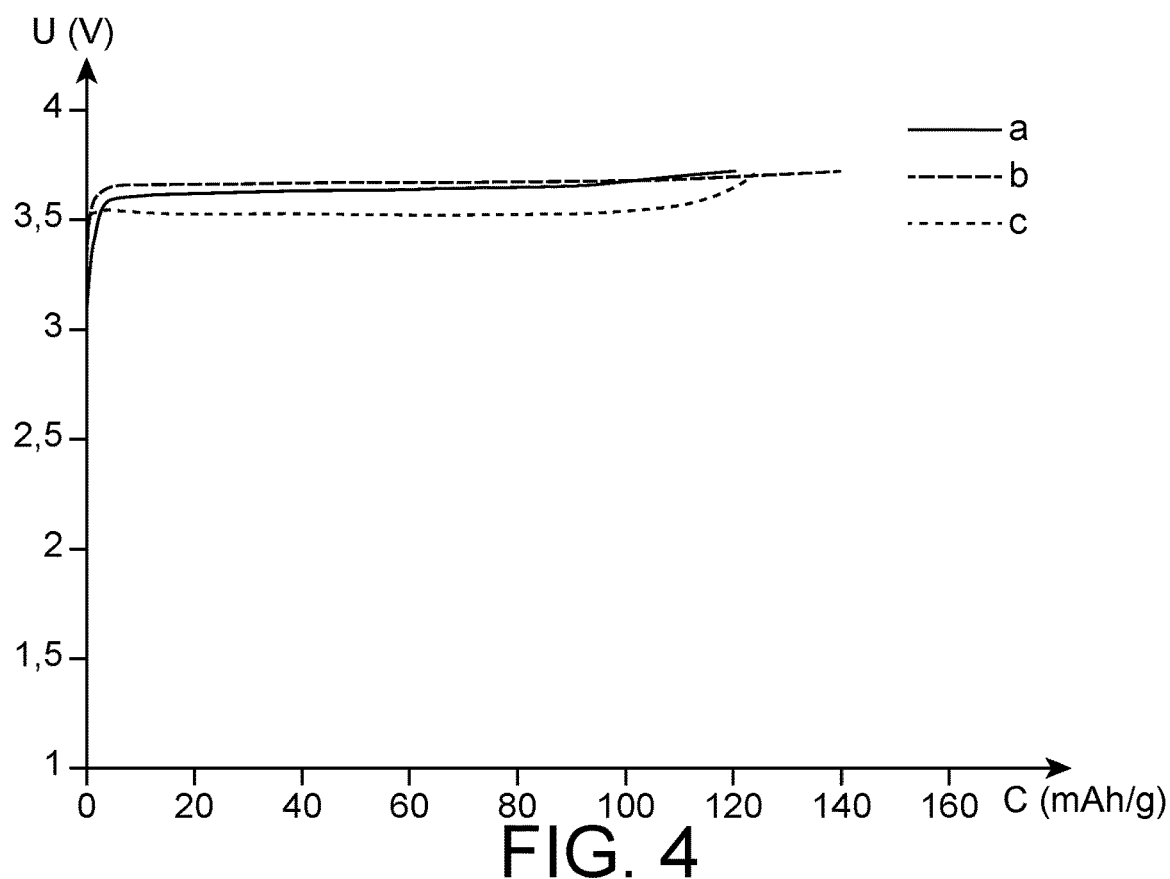
FIG. 4 is a graph illustrating the change in the charging voltage U (in V) at 0.9 mA (C/10) at 20° C. as a function of the capacity per unit mass C (in mAh/g of LiFePO$_4$) with curve a) for the first electrochemical generator, curve b) for the second electrochemical generator and curve c) for the third electrical generator of example 2 below.

For these three electrochemical generators, the change in the charging voltage U (in V) at 0.9 mA (C/10) at 20° C. is determined as a function of the capacity per unit mass C (in mAh/g of $LiFePO_4$), the results being set out in the accompanying FIG. 4 (curve a) by the first electrochemical generator, curve b) for the second electrochemical generator and curve c) for the third electrochemical generator).

In these curves, it is clear that, whatever the material used for the negative electrode, the overvoltages are equivalent and characteristics of lithium-$LiFePO_4$ technology. The capacity per unit mass of $LiFePO_4$ is almost entirely restored. The use of a lithium and calcium alloy for the negative electrode discharging facing a positive electrode comprising $LiFePO_4$ is therefore possible without impairing performance compared with non-alloyed metallic lithium.

Furthermore, the presence of calcium in the lithium alloy constituting the negative electrode helps to make the alloy easier to roll than pure lithium, which makes it possible to envisage the use of such an alloy to form thinner negative electrodes and thus larger developed surfaces, which may prove a major asset in electrochemical generators intended for power applications.

Example 3

The following example illustrates a first electrochemical generator according to the invention in the form of a button battery comprising:

a negative electrode consisting of a 14 mm diameter disc and composed of a lithium and calcium alloy to the extent of calcium at 2% atomic, said electrode having a thickness of 100 µm and a surface area of 1.54 cm$^2$;

a positive electrode consisting of a 16 mm diameter disc, said positive electrode being composed of a layer comprising MnO$_2$ (80% by mass), polyvinylidene fluoride (10% by mass) and acetylene black (10% by mass), this layer being deposited on an aluminium strip having a thickness of 20 µm and the manganese dioxide grammage being between 5.6 and 6.2 mg/cm$^2$, that is to say a battery capacity of between 3.45 and 3.81 mAh;

between the negative electrode and the positive electrode, a Celgard 2400® separator in the form of a disc with a diameter of 16 mm and a surface area of 2 cm$^2$, said separator being impregnated with an electrolyte consisting of a mixture of carbonate solvents EC:PC:DMC in respective proportions by mass of 1/1/3 and a lithium salt 1 M LiPF$_6$.

Another electrochemical generator according to the invention (referred to as the second electrochemical generator) was produced, this electrochemical generator meeting the same specificities as those illustrated above, except that the alloy of the negative electrode comprises 15% by mass calcium.

By way of comparison, another electrochemical generator not in accordance with the invention (referred to as the third electrochemical generator) was produced in this example, this electrochemical generator meeting the same specificities as those in accordance with the invention except that the negative electrode is made from pure lithium.

Figure 5:
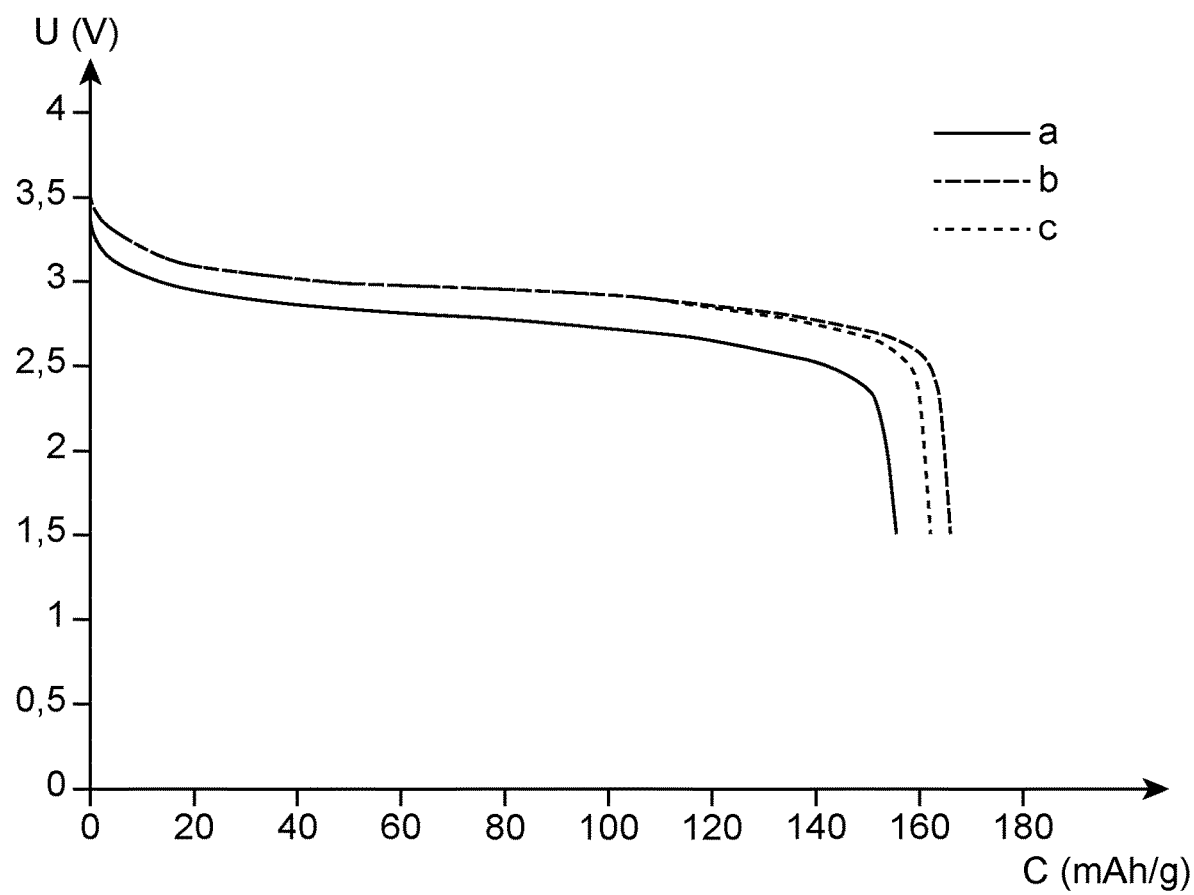
FIG. 5 is a graph illustrating the change in the charging voltage U (in V) at 100 μA at 20° C. as a function of the capacity per unit mass C (in mAh/g) with curve a) for the first electrochemical generator, curve b) for the second electrochemical generator and curve c) for the third electrochemical generator of example 3 below.

For these three electrochemical generators, the change in the discharge voltage U (in V) at 100 µA at 20° C. is determined as a function of the capacity per unit mass C (in mAh/g of MnO$_2$), the results being set out in the accompanying FIG. 5 (curve a) for the first electrochemical generator, curve b) for the second electrochemical generator and curve c) for the third electrochemical generator).

From these curves, it is clear that, whatever the material used for the negative electrode, the overvoltages are equivalent and characteristic of lithium-MnO$_2$ technology (between 2.5 and 3 V). The use of a lithium and calcium alloy for the negative electrode discharging facing a positive electrode comprising MnO$_2$ is therefore possible without impairing the performance compared with non-alloyed metallic lithium.

Furthermore, the presence of calcium in the lithium alloy constituting the negative electrode helps to make the alloy easier to roll than pure lithium, which makes it possible to envisage the use of such an alloy performing thinner negative electrodes and thus larger developed surfaces, which may prove a major asset in electrochemical generators intended for power applications.

What is claimed is:

1. A negative electrode for a lithium electrochemical generator, the negative electrode consisting of an active material, the active material comprising a lithium and calcium alloy, the calcium is present in the alloy in an amount of 2% to 34% atomic and wherein the negative electrode is in the form of a sheet or plate having a thickness ranging from 5 to 200 µm.

2. The negative electrode according to claim 1, wherein the lithium and calcium alloy consists of lithium and calcium.

3. The negative electrode according to claim 1, wherein the calcium is present in the alloy in an amount of 2% to 15% atomic.

4. The negative electrode according to claim 1, wherein the lithium and calcium alloy comprises CaLi$_2$.

5. The negative electrode according to claim 1, which is self-supporting.

6. An electrochemical generator comprising at least one electrochemical cell comprising:

a positive electrode comprising an active material comprising a lithium-insertion material, a negative electrode, and an electrolyte conducting lithium ions disposed between said negative electrode and said positive electrode, characterised in that the negative electrode is as defined according to claim 1.

7. The electrochemical generator according to claim 6, wherein the lithium-insertion material is selected from the group consisting of:

a lithiated oxide comprising at least one transition metal element selected from the group consisting of:

a lithiated oxide of the formula LiMO$_2$, where M is an element selected from the group consisting of Ni, Co, Mn, Al, Mg and mixtures thereof; and a lithiated oxide with a spinel structure, a lithiated phosphate comprising at least one transition metal element having a formula LiM$^1$PO$_4$, where M$^1$ is selected from the group consisting of Fe, Mn, Co and mixtures thereof, manganese dioxide, and mixtures thereof.

8. The electrochemical generator according to claim 7, wherein the lithiated oxide with a spinel structure is LiMn$_2$O$_4$.

9. The electrochemical generator according to claim 7, wherein the lithium-insertion material comprising the lithiated phosphate comprising at least one transition metal element is LiFePO$_4$.

10. The electrochemical generator according to claim 7, wherein the lithium-insertion material is manganese dioxide.

11. The electrochemical generator according to claim 6, wherein the positive electrode further comprises at least one electron-conducting additive and/or at least one binder.

12. The electrochemical generator according to claim 11, wherein the electron-conducting additive is selected from the group consisting of carbon blacks, acetylene blacks, graphite, carbon fibres, carbon nanotubes, titanium, nickel, aluminium, stainless steel and mixtures thereof.

13. The electrochemical generator according to claim 11, wherein the binder is a polymeric binder.

14. The electrochemical generator according to claim 6, wherein the electrolyte conducting lithium ions is a liquid electrolyte comprising at least one organic solvent and at least one lithium salt.

15. The electrochemical generator according to claim 14, wherein the at least one organic solvent is selected from the group consisting of carbonate solvents, ether solvents, amide solvents, sulfoxide solvents, lactone solvents, lactam solvents, nitrile solvents, ester solvents, sulfite solvents and mixtures thereof.

16. The electrochemical generator according to claim 14, wherein the at least one lithium salt is selected from the group consisting of LiPF$_6$, LiClO$_4$, LiBF$_4$, LiAsF$_6$, LiSbF$_6$, LiAlCl$_4$, LiGaCl$_4$, LiCF$_3$SO$_3$, LiC(SO$_2$CF$_3$)$_3$, lithium bis(trifluoromethylsulfonyl)imide, LiN[SO$_2$CF$_3$]$_2$, LiSCN, lithium nitrate LiNO$_3$, lithium bis(oxalato)borate, lithium bis(fluorosulfonyl)imide, LiPF$_3$(CF$_2$CF$_3$)$_3$, lithium trifluoromethanesulfonate LiCF$_3$SO$_3$, lithium fluorosulfonate LiSO$_3$F, LiC$_6$F$_5$SO$_3$, LiO$_3$SCF$_2$CF$_3$, LiO$_2$CCF$_3$, LiB(C$_6$H$_5$)$_4$ and mixtures thereof.

* * * * *